United States Patent
Schrempp et al.

(10) Patent No.: US 10,009,342 B2
(45) Date of Patent: *Jun. 26, 2018

(54) AUTHENTICATION FOR OVER THE TOP BROADCAST STREAMING USING AUTOMATED CONTENT RECOGNITION

(71) Applicant: Audible Magic Corporation, Los Gatos, CA (US)

(72) Inventors: Jim Schrempp, Saratoga, CA (US); Vance Ikezoye, Los Gatos, CA (US)

(73) Assignee: Audible Magic Corporation, Los Gatos, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/790,359

(22) Filed: Oct. 23, 2017

(65) Prior Publication Data
US 2018/0048644 A1  Feb. 15, 2018

Related U.S. Application Data

(63) Continuation of application No. 14/693,674, filed on Apr. 22, 2015, now Pat. No. 9,800,576.

(Continued)

(51) Int. Cl.
*G06F 17/30* (2006.01)
*H04L 29/06* (2006.01)

(52) U.S. Cl.
CPC .......... *H04L 63/0853* (2013.01); *H04L 65/60* (2013.01)

(58) Field of Classification Search
CPC .................................................. H04L 63/0853

(Continued)

(56) References Cited

U.S. PATENT DOCUMENTS 5,918,223 A    6/1999  Blum et al.
6,834,308 B1  12/2004  Ikezoye et al.
(Continued)

FOREIGN PATENT DOCUMENTS

EP    1354276 B1    12/2007

OTHER PUBLICATIONS

International Search Report and Written Opinion for PCT/US15/55167 dated Feb. 2, 2016, 7 pages.

(Continued)

*Primary Examiner* — Teshome Hailu
(74) *Attorney, Agent, or Firm* — Lowenstein Sandler LLP

(57) ABSTRACT

An authenticator in a second user device captures a media sample played on a first user device in proximity to the second user device. The media sample comprises at least one of an audio portion, a video portion or an image portion of a media stream received by the first user device from a remote media streaming source over a network. The authenticator sends at least a portion of the media sample from the second user device to an authentication server, the authentication server to compare the at least the portion of the media sample to a reference media stream received from the remote media streaming source to determine that the second user device is authenticated for viewing the media stream responsive to the portion of the media sample matching the reference media stream. The authenticator then receives an authentication decision from the authentication server at the second user device, the authentication decision indicating whether the second user device is authenticated.

17 Claims, 9 Drawing Sheets

Related U.S. Application Data

(60) Provisional application No. 62/063,603, filed on Oct. 14, 2014.

(58) Field of Classification Search
USPC .............................................................. 726/7
See application file for complete search history.

(56) References Cited

U.S. PATENT DOCUMENTS

| | | | |
|---|---|---|---|
| 7,363,278 | B2 | 4/2008 | Schmelzer et al. |
| 8,006,314 | B2 | 8/2011 | Wold |
| 8,332,326 | B2 | 12/2012 | Schrempp et al. |
| 8,645,279 | B2 | 2/2014 | Schmelzer |
| 8,732,858 | B2 | 5/2014 | Wold |
| 2006/0085862 | A1 | 4/2006 | Witt et al. |
| 2009/0226148 | A1 | 9/2009 | Nesvadba et al. |
| 2013/0047232 | A1* | 2/2013 | Tuchman .............. H04L 9/3226 726/7 |
| 2013/0205330 | A1 | 8/2013 | Sinha et al. |
| 2013/0318581 | A1 | 11/2013 | Counterman |
| 2014/0196077 | A1* | 7/2014 | Gordon .............. H04N 21/8358 725/31 |
| 2014/0201777 | A1 | 7/2014 | Johansson |
| 2015/0215299 | A1* | 7/2015 | Burch .................... H04L 63/08 726/5 |

OTHER PUBLICATIONS

European Extended Search Report and Opinion for EP15850967.9, completed Mar. 23, 2018, dated Apr. 4, 2018, 8 pages.

* cited by examiner

AUTHENTICATION FOR OVER THE TOP BROADCAST STREAMING USING AUTOMATED CONTENT RECOGNITION

RELATED APPLICATIONS

This application is a continuation of U.S. patent application Ser. No. 14/693,674, filed Apr. 22, 2015, which claims the benefit of U.S. Provisional Application No. 62/063,603, filed Oct. 14, 2014, the entire contents of both of which are hereby incorporated by reference herein.

TECHNICAL FIELD

This disclosure relates to the field of media content identification, and in particular to authentication for access to digital media using automated content recognition.

BACKGROUND

A large and growing population of users enjoys entertainment through the consumption of media items, including electronic media, such as digital audio and video, images, documents, newspapers, podcasts, etc. Users employ various electronic devices to consume such media items. Among these electronic devices are electronic book readers, cellular telephones, personal digital assistants (PDAs), portable media players, tablet computers, electronic pads, netbooks, desktop computers, notebook computers, smart eyeglasses, cochlear implants, and the like. Media content suppliers provide media items to consumers through a variety of means. Some media content suppliers deliver media items in single units, others in bulk, others through some linear streaming experience, and others by providing playlists or manifest files of media segments or chunks. Some media content suppliers employ a variety of delivery means. Much electronic media content is offered to users free of charge and subsidized through advertising. This advertising can include advertising messages conveyed using audio, text, logos, animations, videos, photographs or other graphics. Some examples of advertisements include banner ads, frame ads, pop-up ads, floating ads, expanding ads, interstitial ads, video ads, audio ads and text ads. These advertisements can be presented to a user in a variety of ways including on a web-page, through social media applications, on a mobile device, or in an audio or video advertisement slot between or within segments of regular programming or even on top of regular programming.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
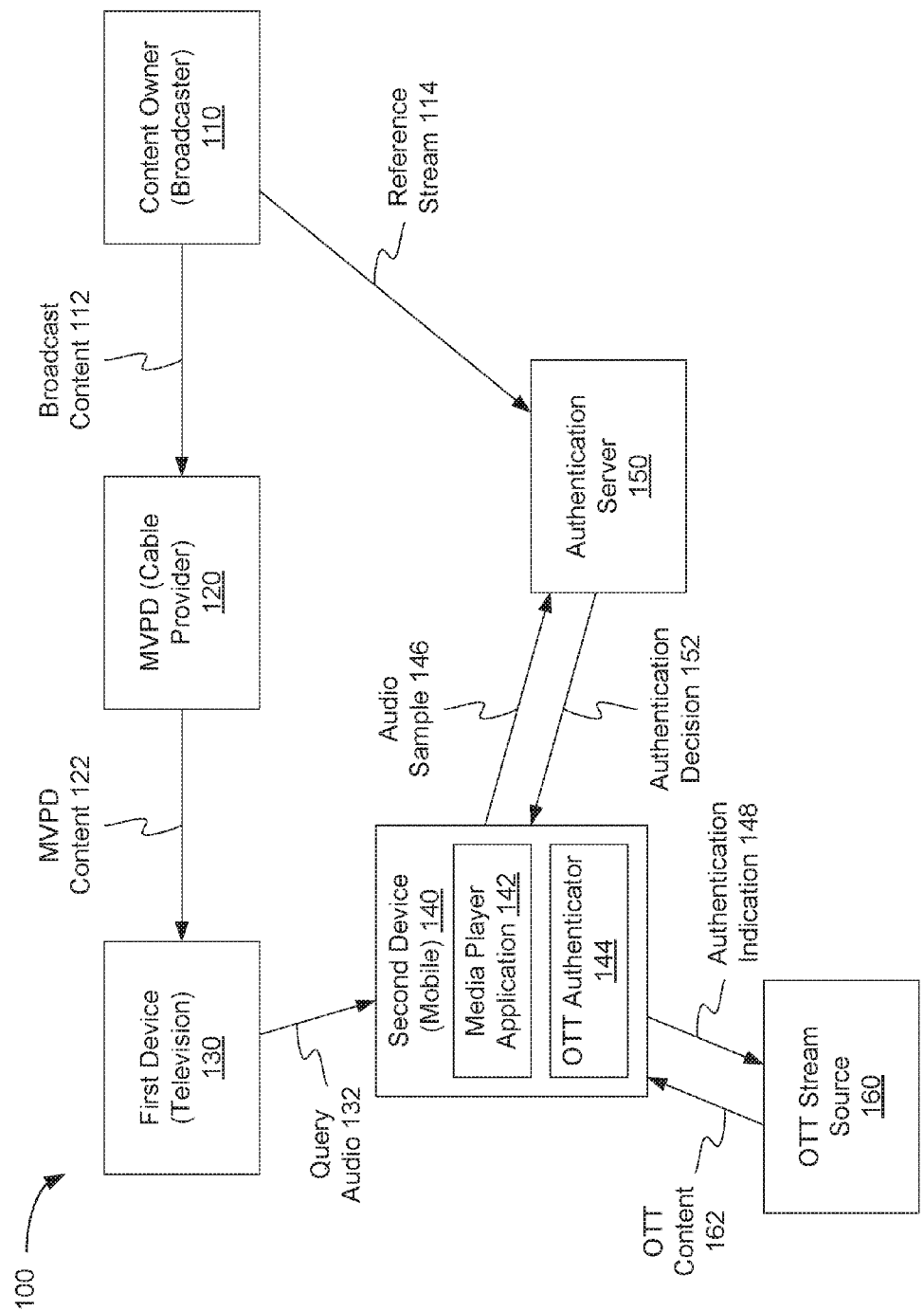
FIG. 1a is a block diagram illustrating a network environment in which embodiments of the present invention may operate.

Embodiments are described for authentication for over the top (OTT) media access using automated content recognition (ACR). Today many pieces of content are only available to be viewed after purchasing a subscription from a multi-channel video program distributor (MVPD), commonly known as a cable television or satellite television provider, or other subscription based media provider. In one common case, the MVPD takes responsibility for distributing the content to the end user. The MVPD only allows this content delivery to terminate at certain devices such as an in-home set top box (STB) or gateway or other device under the direct control of the MVPD. This limits the devices and locations where the subscriber can consume the content.

The promise of "TV everywhere" is that users who subscribe to an MVPD content bundle will be able to consume that content in a variety of locations and on a variety of devices, such as on their home living room TV, on a tablet in their garage, on their phone in a café, etc. Content owners would like to stream their content over a network, such as the Internet, to a host of devices. This so called over the top (OTT) delivery allows users to view the content in the way that is most convenient for them. However, content owners license their content for delivery through MVPDs. These MVPDs pay the content owners for these licenses. To avoid sales channel conflict, OTT streaming by a content owner may be restricted to a device owned by a user who also has a current subscription to an MVPD.

In another embodiment, a media provider maintains certain rights to deliver the media to a user. The user may be a subscriber of the media provider or have some other relationship. The media may typically be delivered to devices that run certain software or that require some cumbersome authentication method. The media provider may wish to make additional media or services available for users to access on a number of different devices without the necessity of a cumbersome authentication method. A content owner may wish to make additional media or services available to media provider subscribers without the necessity of a cumbersome authentication method.

Today's solutions to the authentication function are cumbersome. For example, a user who wants to receive streaming broadcast video on their device has to supply a set of credentials to identify themselves. They are often asked to supply credentials such as an account number, user name, password or other information associated with the media provider of which they are a subscriber. In many cases, however, the users often do not have this information at hand, or it is otherwise inconvenient to provide. As a result, users may become frustrated and are unable to view the streaming content as they please. The same is true of a subscriber to an online edition of a newspaper who wants to view additional content on a different device. The same is true of a subscriber to an online photo archive who wants to view additional content on a different device.

Authentication of the user using automated content recognition (ACR) provides a way for a mobile device application to easily authenticate a user for receiving a streaming Internet broadcast, access to video on demand (VOD) content, digital images, podcasts, newspapers, white papers, books, etc. An ACR based system for authentication can be simple and easy for a user to activate. ACR authentication can replace the credentials that are used to authorize a particular device, thereby bringing ease of use to the authentication process, while limiting abuse to an acceptable level.

ACR Authentication works in concert with a system for mobile device authorization. In one embodiment, ACR provides the authentication to the authorization system. The authorization system may then issue a token that allows access to OTT content. The authorization system is responsible for token management, issuance, and revocation. In one embodiment, the authorization service remembers the history of each device. A suspicious history of activity can be used by the authorization service to deny a token. If this happens, the application may fall back on conventional solutions and ask the user for their relevant subscription account number, user name, etc. The authorization service may also tie into the media provider billing system. It is possible that once a user is authenticated, other work can be done to allow the user to make mobile purchases of content, billed through their media provider.

ACR Authentication relies in part on an assumption that if the user is able to currently consume certain content on their television, PC, ebook reader, or other device, then the user should be allowed to consume that same content, or other OTT content, on another device for some period of time. In one embodiment, when OTT content is requested, an authenticator on the device will listen to ambient audio via a device microphone or sample the video stream via a camera pointed in the direction of a television currently receiving a broadcast stream from an MVPD. In another embodiment an authenticator on the device will sample a still image, or sample a page of text from a printed page, or sample an image off a display device via the device camera. The authenticator may send a fingerprint of that audio and/or video and/or image to a cloud-based identification server. One suitable identification service is offered by Audible Magic Corporation of Los Gatos, Calif. using an audio identification technology such as one described in U.S. Pat. No. 5,918,223, issued Jun. 29, 1999, the entire contents of which are hereby incorporated by reference herein. Parts of a suitable identification service are described in U.S. Pat. No. 6,834,308, issued Dec. 21, 2004, U.S. Pat. No. 7,363,278, issued Apr. 22, 2008, U.S. Pat. No. 8,006,314, issued Aug. 23, 2011, U.S. Pat. No. 8,332,326, issued Dec. 11, 2012, U.S. Pat. No. 8,645,279, issued Feb. 4, 2014, U.S. Pat. No. 8,732,858, issued May 20, 2014 and European Patent no. EP 1 354 276, issued Dec. 12, 2007, the entire contents of each of which are hereby incorporated by reference herein. If the ambient audio or video or image is matched to a live broadcast channel, then the device is authenticated. The authorization service is notified that the device has been successfully authenticated and the authorization service will then decide the type of token to issue and an expiration date for the token, if appropriate. In certain geographic areas, some live broadcasts are available only via certain MVPDs. Using the geographic location of the mobile device and the specific live broadcast identified, it may be possible for the authorization system to infer that a particular device may be allowed to stream any of a group of broadcasts to their mobile device for some period of time.

In another embodiment, the device that is to be authorized will use its camera to sample the screen of another device which is already authorized. The device that is to be authorized will compute an image fingerprint using one of the techniques well known in the art and send that fingerprint to an identification service. If the fingerprint is matched to fingerprints of certain other content, then the authorization service will be notified that the device has been successfully authenticated. In this way a user will only be required to interact with a cumbersome authentication method on one device. Once that device is authorized then media content presented on or by that device can be used to authenticate additional devices.

In another embodiment, a content owner may want to make certain offers to purchase available only to people who subscribe to certain media providers. These content owners could use ACR Authentication to determine the eligibility of a particular user to receive these offers. In another embodiment an event venue such as a stadium may want to provide tickets for a certain event to subscribers of a certain media provider.

One strength of the system described herein is that the ACR authentication can be restricted to identify a broadcast only when the sampled user audio or video is in very close time synchronization with an audio or video or image reference stream generated at the source transmission point. This requirement for close time synchronization can make it more difficult for those users who would want to improperly obtain an ACR authentication. While improper authentications can be limited, the solution may err on the side of allowing authentications in order to provide the best possible user experience. To contain risk, the authorization system may issue authorization tokens that are only good for a limited amount of time. As the system builds confidence in a particular device, the authorization time and scope for the tokens may be extended. This limits the exposure for any one improper authentication.

FIG. 1a is a block diagram illustrating a network environment 100 in which embodiments of the present invention may operate. In one embodiment, network environment 100 includes content owner 110 (e.g., a broadcaster), multichannel video program distributor (MVPD) 120 (e.g., a cable television provider), a first user device 130 (e.g., a television), a second user device 140 (e.g., a mobile device such as a tablet computer or smartphone), authentication server 150, and over the top (OTT) stream source 160. In one embodiment, first user device 130 may include a Set Top Box (STB) or other device for receiving MVPD content 122. In another embodiment, the STB may be in a separate device. In one embodiment, the first and second user devices 130 and 140 may be any type of computing device including a desktop computer, laptop computer, mobile communications device, cell phone, smart phone, hand-held computer, tablet computer, set top box (STB), digital video recorder (DVR), wearable computer, or similar computing device. The first and second user devices 130 and 140 may be variously configured with different features to enable the recording and viewing of content and resources, and the execution of one or more applications. In one embodiment, the various entities in the network environment may be connected to one another over one or more networks. These networks can include a local area network (LAN), a wireless network, a telephone network, a mobile communications network, a wide area network (WAN), such as the Internet, near field communication link, Bluetooth, or similar communication system.

In one embodiment, content owner 110 generates a linear stream of broadcast content 112 for distribution. The content stream may include television programs, movies, video clips, audio clips, advertisements or other media content. For example, content owner 110 may be an entertainment company, a broadcasting company, television network, or other media company. In one embodiment, content owner 110 distributes broadcast content 112 through one or more MVPDs, such as MVPD 120. MVPD 120 is a service provider that delivers video programming services, usually for a subscription fee (i.e., pay television). MVPD 120 may include, for example, a cable television (CATV) system, a direct-broadcast satellite (DBS) provider, a wireline video provider, or a competitive local exchange carrier (CLEC) using Internet Protocol television (IPTV).

In one embodiment, MVPD 120 may pay a carriage fee to content owner 110 for the rights to carry and distribute broadcast content 112 received from the content owner 110. In turn, MVPD 120 may sell subscriptions to users, including a user who owns first device 130 and second device 140. Upon payment of the subscription fees or a single time use fee, MVPD 120 may provide MVPD content 122 for viewing on first device 130 (e.g., a television). In one embodiment, content owner 110 may also make the broadcast content 112 that it provides to MVPD 120 available in some other format (e.g., over the top (OTT) delivery). OTT delivery may allow for streaming of content over the Internet or other network. Content owner 110 may be wary of making the OTT content widely available for fear of an impact on the number of subscribers to MVPD 120, and accordingly to the carriage fees paid by MVPD 120 to content owner 110.

In response, content owner 110 may make the OTT content available only to users who are already subscribers to MVPD 120. If a user is a subscriber to MVPD 120, the viewing of OTT content should not adversely affect the subscription status of the user. Accordingly, content owner 110 may wish to ascertain that a user requesting OTT content is a subscriber of MVPD 120. In lieu of conventional authentication techniques (e.g., verification of user log-on credentials), in one embodiment, automated content recognition (ACR) is utilized.

In one embodiment, a user may request to stream OTT content from OTT stream source 160 to the second user device 140. In one embodiment, a user may launch a media player application 142 and select the content they wish to stream. The principle in practice behind ACR authentication is that if the user is able to view MVPD content 122 on first device 130, then they should be allowed to stream OTT content 162 on second device 140. In one embodiment, an OTT authenticator 144 (or other authenticator) on second user device 140 captures a query audio stream 132 from first user device 130 via a microphone. OTT authenticator 144 then provides an audio sample 146 of the captured query audio 132 to an authentication server 150. In one embodiment, authentication server 150 also receives a reference audio stream 114 from content owner 110. In one embodiment reference stream 114 may be received from the MVPD 120. Authentication server 150 compares the audio sample 146 to the reference stream 114 using ACR techniques, as described in more detail below. As a result of the comparison, authentication server 150 provides an authentication decision 152 back to the second user device 140 to indicate whether or not the audio sample 146 matches reference stream 114.

If the authentication decision 152 indicates that audio sample 146 matches reference stream 114, OTT authenticator 144 can determine that the user of second device 140 is an authenticated subscriber of MVPD 120 and therefore authorized to stream OTT content. In one embodiment, OTT authenticator passes an authentication indication 148 to OTT stream source 160 and receives the requested OTT content 162 which can be displayed to the user by media player application 142. In one embodiment, OTT authenticator 144 may perform an additional authorization process after the ACR authentication is performed, as will be described in more detail below with respect to FIG. 2.

In one embodiment, reference stream data 114 provided by content owner 110 to authentication server 150 includes all of the possible broadcast content 112 that MVPD 120 may be providing to first user device 130 as MVPD content 122. In this case, no matter what channel first user device 130 is tuned to, the audio sample 146 from query audio 132 may have a match in reference stream 114, as long as the user of first device 130 is a subscriber of MVPD 120. In one embodiment, the data in reference stream 114 may be limited based on the location of second user device 140. For example, OTT authenticator 144 may pass the GPS location of second user device 140 to authentication server 150. In turn, authentication server 150 may request a reference stream 114 appropriate for the corresponding location. In one embodiment, authentication server 150 receives many streams from content owner 110 and uses the GPS location of second user device 140 as a criterion for determining a correct match. If only certain MVPDs are available at the corresponding location, then reference stream 114 need only include data for the channels available on those MVPDs, rather than every possible channel. In another embodiment, OTT authenticator 144, authentication server 150, and content owner 110 may have a prearranged channel or set of channels to use for authentication purposes. In this embodiment, OTT authenticator 144 may instruct the user to tune first device 130 to one of these predetermined test channels in order to capture the query audio 132. In this embodiment, reference stream 114 need only include data for the predetermined test channel or channels, thereby significantly reducing the required bandwidth and storage. In one embodiment, in order to reduce the size of the reference database, authentication server 150 may only hold reference streams for a fixed period of time. The reference stream 114 should correspond to the live MVPD content stream 122 so that an accurate comparison may be performed. Accordingly, the reference stream data 114 may need only represent a few seconds, or a few minutes of audio data in order for the comparison to be performed. In one embodiment, the reference stream 114 includes only a fingerprint of the reference audio. In one embodiment, audio sample 146 includes only a fingerprint of query audio 132. It is noted that elsewhere in this application the process of comparing audio or video is described; this comparison may be done on the captured media itself or on a fingerprint computed from the media or through the recovery of a watermark embedded in MVPD Content 122. Future references may only mention comparing audio to make the description clearer. Authentication server 150 may compare the fingerprints to one another to determine if there is a match using certain techniques. One such technique is described in U.S. Pat. No. 5,918,223, issued Jun. 29, 1999, the entire contents of which are hereby incorporated by reference herein. In one embodiment, OTT authenticator 144 may obtain information from first device 130 about MVPD 120, from which first device 130 is receiving MVPD content 122. This information may be obtained by OTT authenticator 144 by any communication means such as Blue Tooth, near field communication, infrared transmission, etc.

Figure 1B:
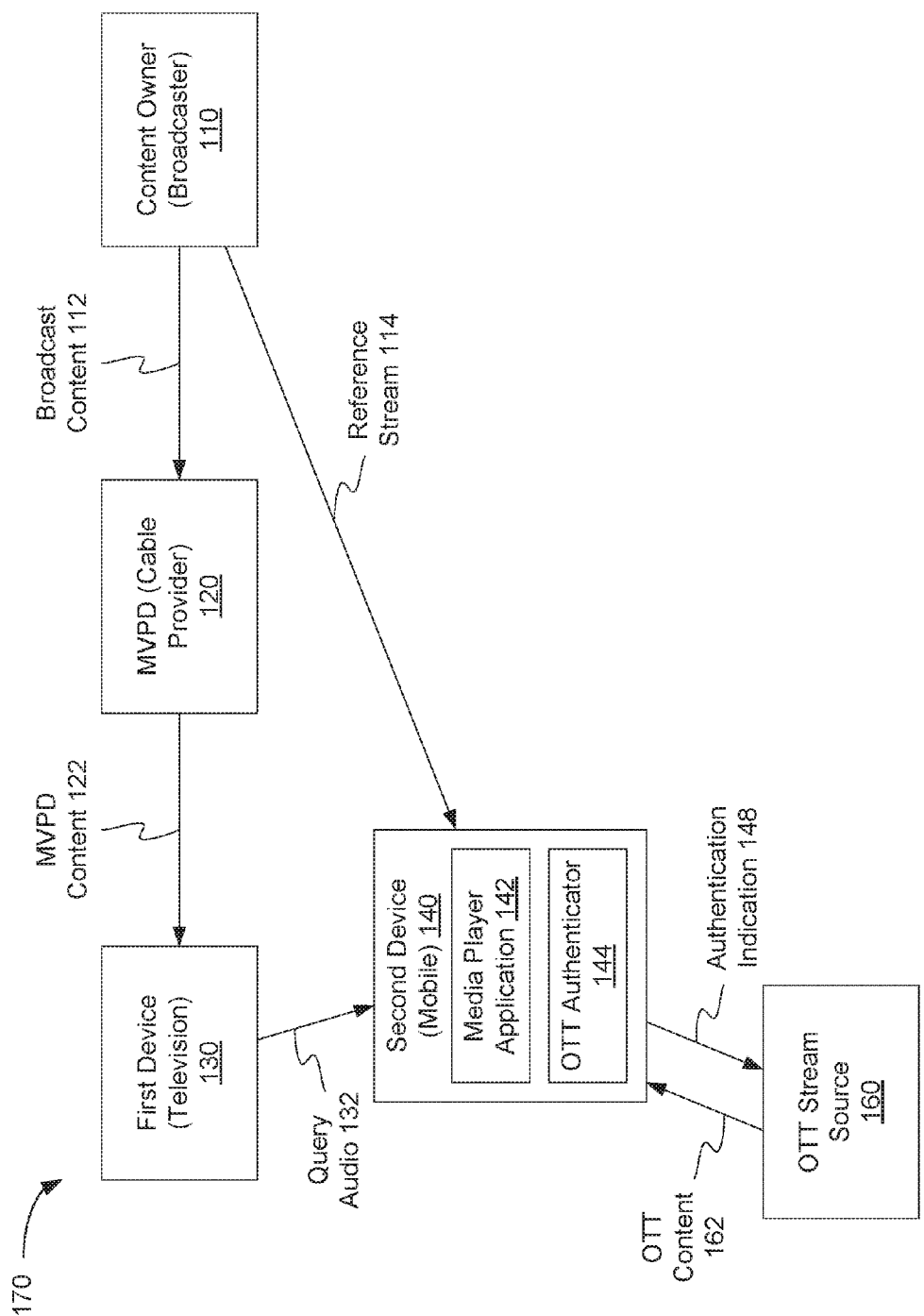
FIG. 1b is a block diagram illustrating a network environment in which embodiments of the present invention may operate.

FIG. 1b is a block diagram illustrating a network environment 170 in which embodiments of the present invention may operate. Network environment 170 is similar to network environment 100, described above with respect to FIG. 1a, except that network environment 170 does not include a separate authentication server. Rather, in network environment 170, content owner 110 provides reference stream 114 directly to second user device 140. In one embodiment, the reference stream 114 is provided by the MVPD to second user device 140. In one embodiment, OTT authenticator 144 performs the ACR authentication locally, without utilizing a separate authentication server. OTT authenticator 144 may compare at least a portion of query audio 132 to at least a portion of reference stream 114 in order to determine whether the user is authenticated. Upon determining that the user is authenticated, OTT authenticator 144 may provide the authentication indication 148 to OTT stream source 160 and receive the request OTT content 162. In one embodiment, OTT authenticator 144 may perform an additional authorization process after the ACR authentication is performed, as will be described in more detail below with respect to FIG. 2.

Figure 2:
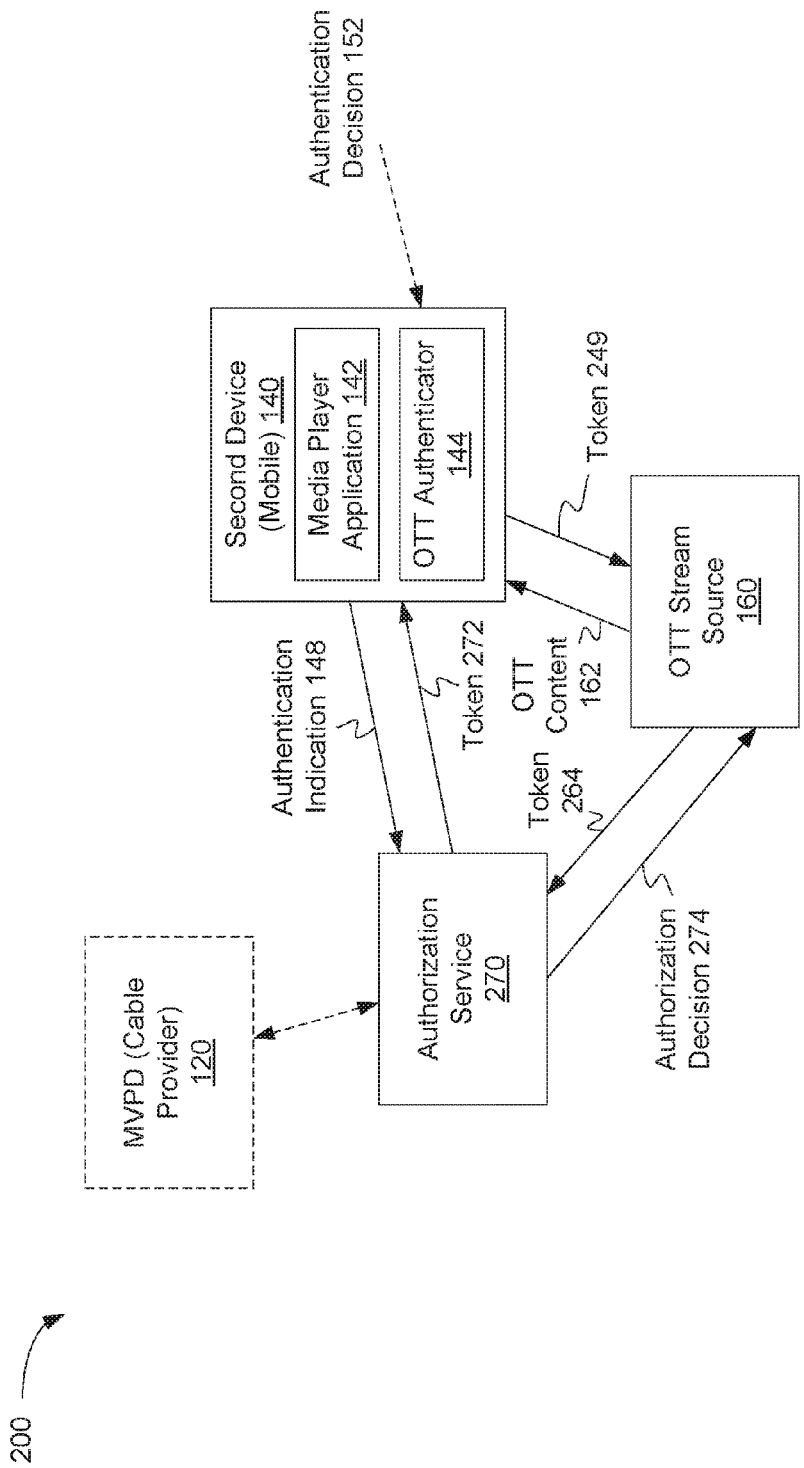
FIG. 2 is a block diagram illustrating an authorization environment, according to an embodiment.

FIG. 2 is a block diagram illustrating an authorization environment 200, according to an embodiment. In one embodiment, authorization environment 200 includes second user device 140 (e.g., a mobile device such as a tablet computer or smartphone), over the top (OTT) stream source 160, and authorization service 270. In one embodiment, OTT authenticator 144 in second user device 140 receives an authentication decision 152 made using ACR authentication as described above. In one embodiment, the authentication decision 152 is received from an authentication server 150. In another embodiment, the authentication decision 152 is made internally by OTT authenticator without utilizing a separate authentication server.

In one embodiment, when the user is properly authenticated using ACR authentication, OTT authenticator 144 provides an indication 148 of the authentication decision to authorization service 270. In response to the indication 148, authorization service 270 may issue an authorization token 272 back to second user device 140. In one embodiment, the authorization token 272 indicates what OTT content the second user device 140 is authorized to receive. This may be based for example, on details of the user's subscription with MVPD 120. In one embodiment, authorization service 270 may communicate with MVPD 120 to access the details of the user's subscription, including what content and channels the user is authorized to access. In one embodiment, this information may be maintained in a MVPD subscriber database managed by the MVPD 120. In one embodiment, the MVPD 120 might only be able to determine a "likely" identify of the subscriber by using the GPS location of second device 140. Second device 140 may not know the identity of the MVPD subscriber. Second device may know a GPS location and that ACR authentication was successful. Based on the GPS location provided by second device 140, MVPD 120 might determine that there is some number of likely or possible subscribers. For example, if the GPS location identifies an apartment building where multiple subscribers to MVPD 120 are known to reside. In another embodiment, if second device 140 is on a WiFi network that uses a public IP address assigned by MVPD 120, MVPD 120 might use that information to narrow the list of likely subscribers.

Upon receiving the token 272, OTT authenticator 144 may pass the token 249 along with a request for OTT content to OTT stream source 160. OTT stream source 160 may receive the token 249 and pass the token 264 back to authorization service 270. If authorization service 270 verifies that the token 264 is valid (e.g., by comparing it to the token 272 issued to second user device 140), then authorization service 270 may determine that the user is authorized to receive the requested OTT content. Authorization service 270 may provide an affirmative authorization decision 274 to OTT stream source 160, which may in turn, provide the requested OTT content 162 to second user device 140.

Figure 3:
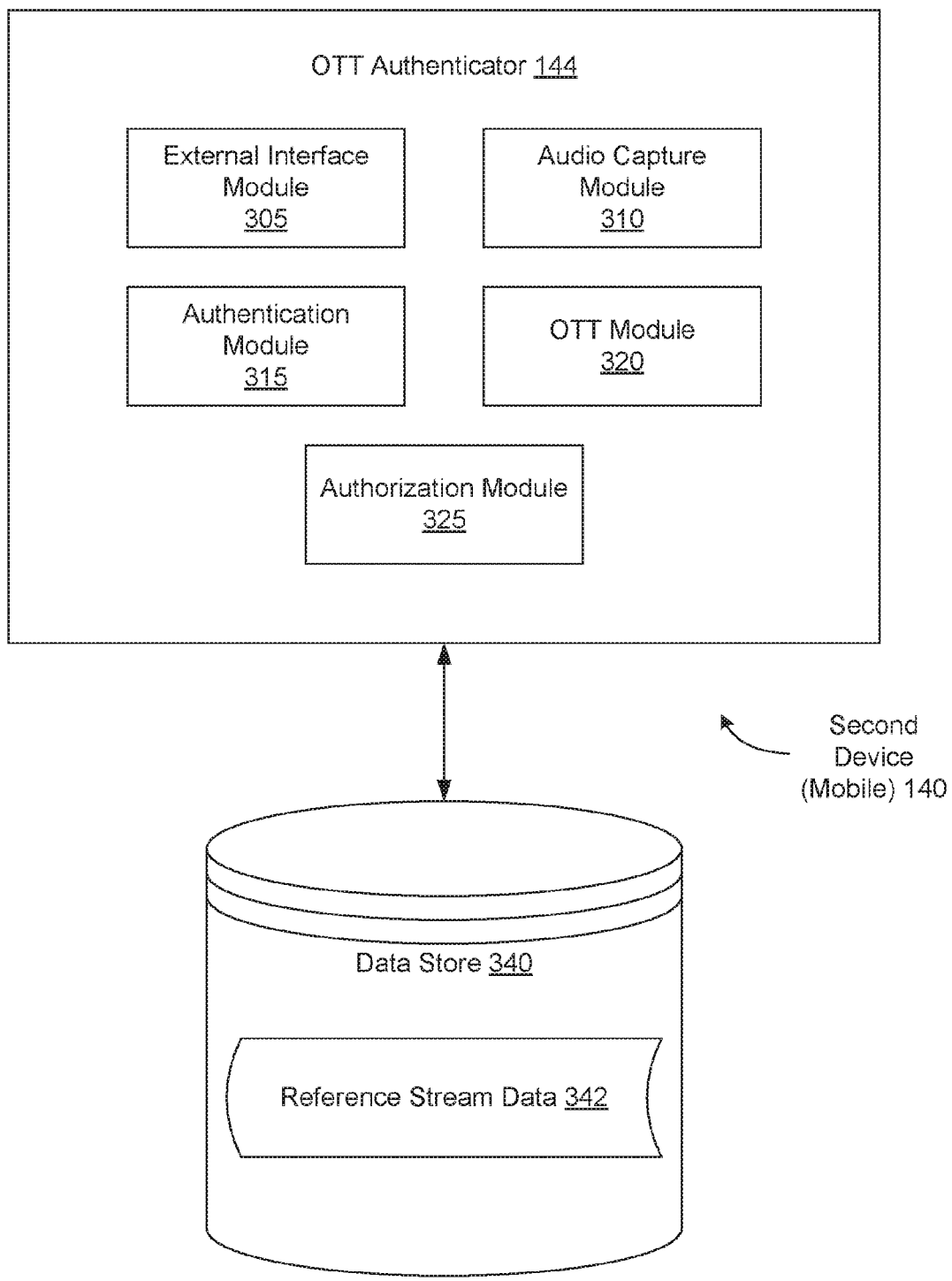
FIG. 3 is a block diagram illustrating an OTT authenticator, according to an embodiment.

FIG. 3 is a block diagram illustrating an OTT authenticator 144 that is included in second device 140, according to an embodiment. In one embodiment, OTT authenticator 144 includes external interface module 305, audio/video capture module 310, authentication module 315, OTT module 320 and authorization module 325. This arrangement of modules and components may be a logical separation, and in other embodiments, these modules or other components can be combined together or separated in further components, according to a particular embodiment. In one embodiment, data store 340 is connected to OTT authenticator 144 and includes reference stream data 342. In one embodiment, OTT authenticator 144 may be part of an operating system running on second device 140. In another embodiment, OTT authenticator 144 may be a standalone application running on second device 140. In one embodiment, second device 140 may include both OTT authenticator 144 and data store 340. In another embodiment, data store 340 may be external to second device 140 and may be connected to second device 140 over a network or other connection. In other embodiments, OTT authenticator may include different and/or additional components which are not shown to simplify the description. Data store 340 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, external interface module 305 controls interaction with other components of second user device 140 or with other devices besides second user device 140. For example, a user may request to view OTT content using a media player application 142 also running on second user device 140. Media player application 142 may provide a user interface that allows selection of OTT content for viewing. In response to the user input, media player application 142 may call OTT authenticator 144 to request user authentication for streaming of the OTT content. In one embodiment, external interface module 305 receives the call from media player application 142.

In one embodiment, audio/video capture module 310 captures ambient audio using a microphone or video using a camera on second user device 140. In response to a request for authentication, external interface module 305 may signal audio/video capture module 310 to begin capture of ambient audio and/or video. In one embodiment, audio/video capture module 310 captures query audio 132 emitted by first user device 130. The query audio 132 may correspond to MVPD content 122 that is currently being played on first user device 130. The presence of query audio 132 corresponding to MVPD content 122 is indicative of the fact that the user of first user device 130 and second user device 140 is a subscriber of MVPD 120, or at least that the user of second user device 140 is in proximity to a first device 130 controlled by another user who is a subscriber.

In one embodiment, authentication module 315 provides an audio sample 146 of the query audio 132 captured by audio/video capture module 310 to an authentication server 150. In one embodiment, the audio sample 146 is a fingerprint of the captured query audio 132. Authentication server 150 may compare the audio sample 146 to a reference stream 114 to determine if there is a match. In response to the comparison, authentication server 150 may provide an authentication decision indicative of the results of the comparison. Authentication module 315 may receive the authentication decision 152. In one embodiment, authentication module 315 performs the authentication internally without utilizing any external authentication server. Authentication module 315 may receive reference stream 114 directly from content owner 110 and store it as reference stream data 342 in data store 340. Authentication module 315 may compare the captured query audio 132 to the reference stream 114 to determine if there is a match. If the query audio 132 matches the reference stream 114 within some threshold or tolerance level, authentication module 315 may determine that the user is authenticated as a subscriber of MVPD 120. In another embodiment, authentication module 315 may communicate with the STB component of first user device 130 to obtain MVPD information.

In one embodiment, OTT module 320 controls streaming of OTT content received from OTT stream source 160. In response to determining that the user is authenticated, authentication module 315 may signal OTT module 320 to request streaming of the OTT content. In one embodiment, OTT module 320 provides an authentication indication 148, indicating that the user is authenticated, along with a request for the specific content to OTT stream source 160. In response, OTT stream source 160 provides the requested OTT content 162. In one embodiment, the requested OTT content 162 is received by OTT module 320. OTT module 320 may provide the received OTT content 162 to media player application 142 for user playback.

In one embodiment, authorization module 325 performs additional authorization of the user prior to streaming the OTT content. In one embodiment, authorization module 325 provides an indication 148 of the authentication decision to authorization service 270. In response to the indication 148, authorization service 270 may issue an authorization token 272 back to second user device 140. Upon receiving the token 272, authorization module 325 may pass the token 249 along with a request for OTT content to OTT stream source 160. OTT stream source 160 may receive the token 249 and pass the token 264 back to authorization service 270. If authorization service 270 verifies that the token 264 is valid (e.g., by comparing it to the token 272 issued to second user device 140, or by verification of a cryptographic signature), then authorization service 270 may determine that the user is authorized to receive the requested OTT content. Authorization service 270 may provide an affirmative authorization decision 274 to OTT stream source 160, which may in turn, provide the requested OTT content 162 to second user device 140.

Figure 4:
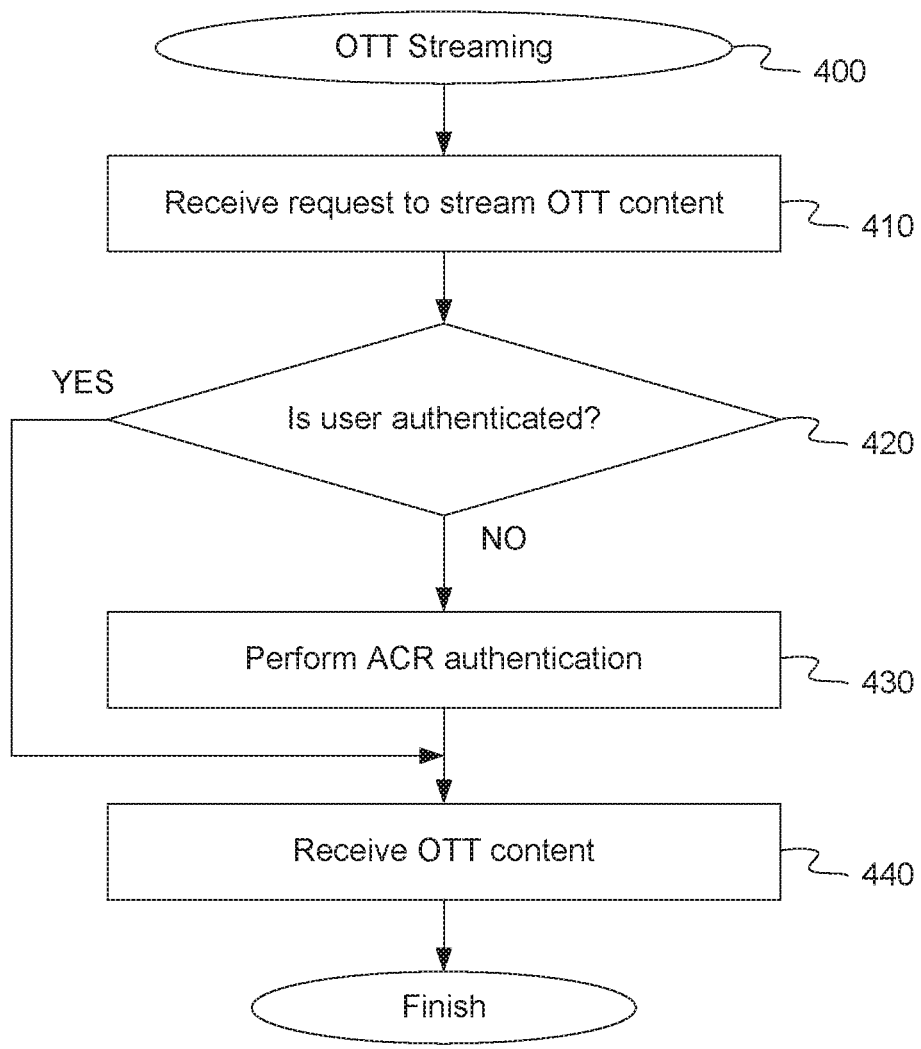
FIG. 4 is a flow diagram illustrating an OTT media streaming method, according to an embodiment.

FIG. 4 is a flow diagram illustrating an OTT method, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to process requests for streaming OTT content and authenticate the requesting user or device using ACR authentication. In one embodiment, method 400 may be performed by OTT authenticator 144, as shown in FIGS. 1a-3.

Referring to FIG. 4, at block 410, method 400 receives a request to stream OTT content. In one embodiment, a user may request to view OTT content using a media player application 142 also running on second user device 140. Media player application 142 may provide a user interface that allows selection of OTT content for viewing. In response to the user input, media player application 142 may call OTT authenticator 144 to request user authentication for streaming of the OTT content. In one embodiment, external interface module 305 receives the call from media player application 142. In another embodiment, rather than receiving a request to stream OTT content, the authentication process described herein could be triggered in another way. For example, in one embodiment when media player application 142 is installed and run for the first time, the application 142 might prompt the user to perform authentication and proceed without asking for OTT content at that time. The authentication or authorization token would be stored and used later in the event of a request to stream OTT content. In the case of a token that has expired, or is close to expiry, the application 142 may sense when the user is at the GPS location of a recent authentication and prompt them to authenticate again. In another embodiment, the authentication may be performed in response to a user request, for example in a situation where a user can authenticate their device in order to obtain access to special content. In another embodiment, a user may be in a venue that plays some specific content and the second user device authenticates with this content; this venue authentication may then be used to access additional content that may be made available to those devices that were authenticated at the venue.

At block 420, method 400 determines whether a user is authenticated. The user may be authenticated through conventional means, such as by logging into an on-line account using a MVPD provided login credentials. A user who is already logged into their account may be deemed to be authenticated. In one embodiment, authentication module 315 maintains an authentication status. If the user is already authenticated, then they may be allowed to stream OTT content to second user device 140. If the user is not already authenticated, at block 430, method 400 performs ACR authentication. In one embodiment, authentication module 315 provides an audio sample 146 of the query audio 132 captured by audio/video capture module 310 to an authentication server 150. Authentication server 150 may compare the audio sample 146 to a reference stream 114 to determine if there is a match. In response to the comparison, authentication server 150 may provide an authentication decision 152, indicative of the results of the comparison, to authentication module 315. In another embodiment, authentication module 315 performs the authentication internally without utilizing any external authentication server. Authentication module 315 may receive reference stream 114 directly from content owner 110 compare the captured query audio 132 to the reference stream 114 to determine if there is a match. If the query audio 132 matches the reference stream 114 within some threshold or tolerance level, authentication module 315 may determine that the user is authenticated.

If the user is already authenticated or after being authenticated using ACR authentication, at block 440, method 400 receives the OTT content. In one embodiment, authentication module 315 may signal OTT module 320 to request streaming of the OTT content. In one embodiment, OTT module 320 provides an authentication indication 148, indicating that the user is authenticated, along with a request for the specific content to OTT stream source 160. In response, OTT stream source 160 provides the requested OTT content 162. In one embodiment, the requested OTT content 162 is received by OTT module 320. OTT module 320 may provide the received OTT content 162 to media player application 142 for user playback.

Figure 5A:
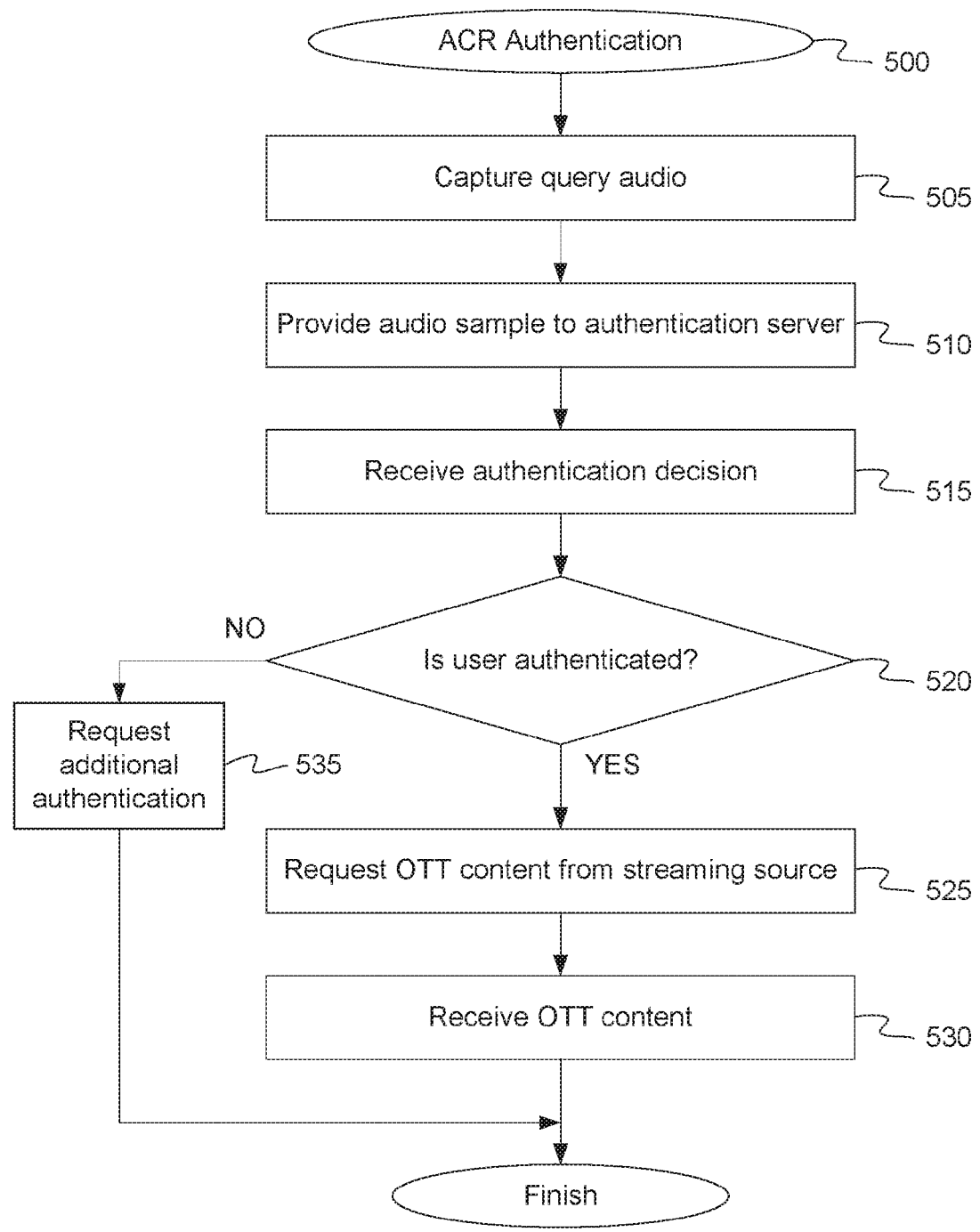
FIG. 5a is a flow diagram illustrating an ACR authentication method for OTT streaming, according to an embodiment.

FIG. 5a is a flow diagram illustrating an ACR authentication method, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to authenticate a user requesting to stream OTT content by comparing a live audio sample to a reference audio stream using automated content recognition (ACR). In one embodiment, method 500 may be performed by OTT authenticator 144, as shown in FIGS. 1a-3.

Referring to FIG. 5a, at block 505, method 500 captures a query audio stream 132. In one embodiment, audio/video capture module 310 captures ambient audio using a microphone on second user device 140. In response to a request for authentication, external interface module 305 may signal audio/video capture module 310 to begin capture of ambient audio. In one embodiment, audio/video capture module 310 captures query audio 132 emitted by first user device 130. The query audio 132 may correspond to MVPD content 122 that is currently being played on first user device 130.

At block 510, method 500 provides an audio sample 146 to authentication server 150. In one embodiment, authentication module 315 provides the audio sample 146 of the query audio 132 captured by audio/video capture module 310 to authentication server 150. In one embodiment, the audio sample 146 is a fingerprint of the captured query audio 132. In one embodiment, the audio sample 146 is a watermark recovered from the captured query audio 132. In one embodiment, audio sample 146 is a fingerprint of the captured video. In one embodiment, the audio sample 146 is an MVPD identifier obtained from the STB in first user device 130.

At block 515, method 500 receives an authentication decision 152 from authentication server 150. Authentication server 150 may compare the received audio sample 146 to a reference stream 114 to determine if there is a match. In response to the comparison, authentication server 150 may provide an authentication decision 152, indicative of the results of the comparison, which may be received by authentication module 315.

At block 520, method 500 determines if the user is authenticated. If the query audio 132 matches the reference stream 114 within some threshold or tolerance level, authentication module 315 may determine that the user is authenticated as a subscriber of MVPD 120.

If the user is authenticated, at block 525, method 500 requests OTT content 162 from streaming source 160. In one embodiment, OTT module 320 provides an authentication indication 148, indicating that the user is authenticated, along with a request for the specific content to OTT stream source 160. In response, OTT stream source 160 provides the requested OTT content 162. At block 530, method 500 receives the OTT content 162. In one embodiment, the requested OTT content 162 is received by OTT module 320. OTT module 320 may provide the received OTT content 162 to media player application 142 for user playback.

If at block 520, method 500 determines that the user is not authenticated using ACR authentication, at block 535, method 500 requests additional authentication information. In one embodiment, authentication module 315 may request a set of credentials from the user for identification. Authentication module 315 may request an account number, user name, password or other information associated with MVPD 120 of which they are a subscriber.

Figure 5B:
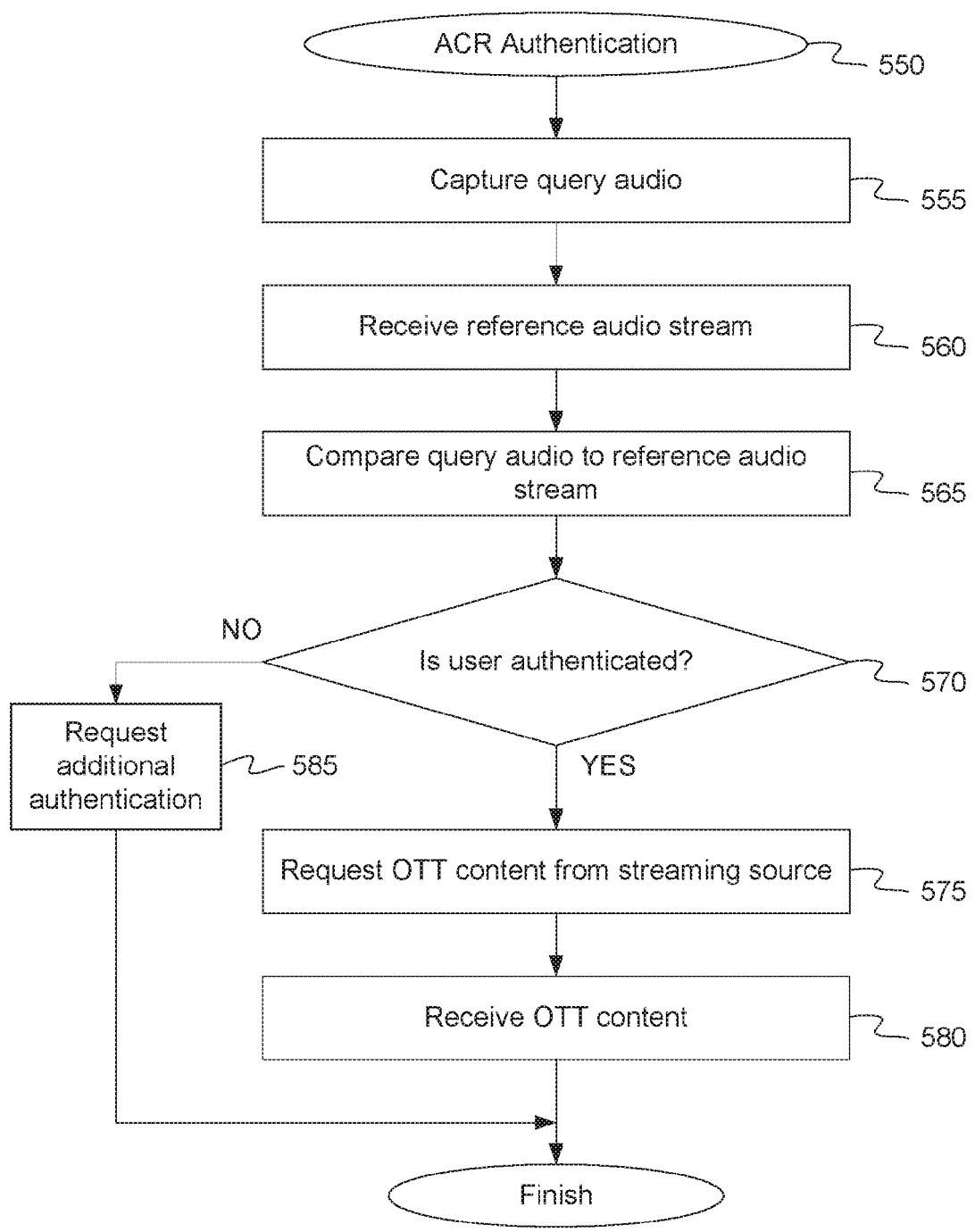
FIG. 5b is a flow diagram illustrating an ACR authentication method for OTT streaming, according to an embodiment.

FIG. 5b is a flow diagram illustrating an ACR authentication method, according to an embodiment. The method 550 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to authenticate a user requesting to stream OTT content by comparing a live audio sample to a reference audio stream using automated content recognition (ACR). In one embodiment, method 500 may be performed by OTT authenticator 144, as shown in FIGS. 1a-3.

Referring to FIG. 5b, at block 555, method 550 captures a query audio stream 132. In one embodiment, audio/video capture module 310 captures ambient audio using a microphone on second user device 140. In response to a request for authentication, external interface module 305 may signal audio/video capture module 310 to begin capture of ambient audio. In one embodiment, audio/video capture module 310 captures query audio 132 emitted by first user device 130. The query audio 132 may correspond to MVPD content 122 that is currently being played on first user device 130.

At block 560, method 550 receives a reference audio stream 114 from content owner 110. In one embodiment, authentication module 315 performs the authentication internally without utilizing any external authentication server. Authentication module 315 may receive reference stream 114 directly from content owner 110 and store it as reference stream data 342 in data store 340.

At block 565, method 550 compares the query audio to the reference audio stream. Authentication module 315 may compare the captured query audio 132 to the reference stream 114 to determine if there is a match. At block 570, method 550 determines if the user is authenticated. If the query audio 132 matches the reference stream 114 within some threshold or tolerance level, authentication module 315 may determine that the user is authenticated as a subscriber of MVPD 120.

If the user is authenticated, at block 575, method 550 requests OTT content 162 from streaming source 160. In one embodiment, OTT module 320 provides an authentication indication 148, indicating that the user is authenticated, along with a request for the specific content to OTT stream source 160. In response, OTT stream source 160 provides the requested OTT content 162. At block 580, method 550 receives the OTT content 162. In one embodiment, the requested OTT content 162 is received by OTT module 320. OTT module 320 may provide the received OTT content 162 to media player application 142 for user playback.

If at block 570, method 550 determines that the user is not authenticated using ACR authentication, at block 585, method 550 requests additional authentication information. In one embodiment, authentication module 315 may request a set of credentials from the user. For example, authentication module 315 may request an account number, user name, password or other information associated with MVPD 120 of which they are a subscriber.

Figure 6:
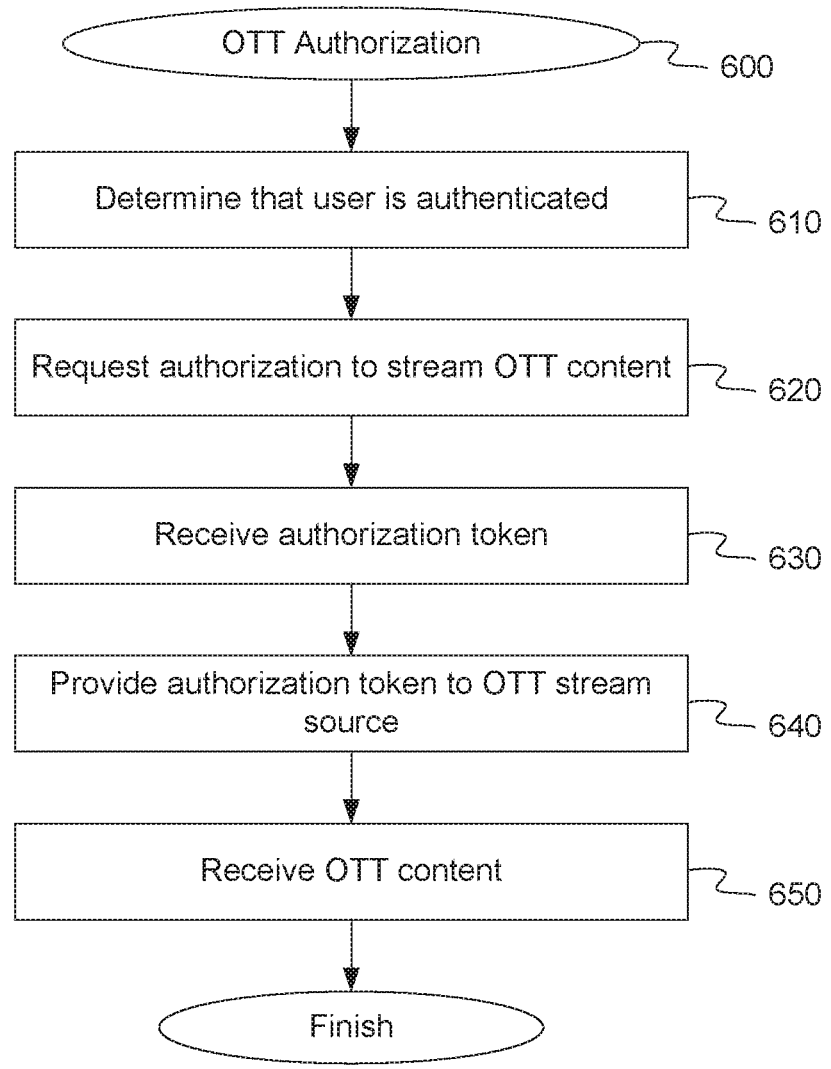
FIG. 6 is a flow diagram illustrating an OTT authorization method, according to embodiment.

FIG. 6 is a flow diagram illustrating an OTT authorization method, according to embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to determine whether a user having been authenticated using ACR authentication is authorized to receive the requested OTT streaming content. In one embodiment, method 600 may be performed by OTT authenticator 144, as shown in FIGS. 1a-3.

Referring to FIG. 6, at block 610, method 600 determines that the user is authenticated. As described above, authentication module 315 performs ACR authentication. In one embodiment, authentication module 315 provides an audio sample 146 of the query audio 132 captured by audio/video capture module 310 to an authentication server 150. Authentication server 150 may compare the audio sample 146 to a reference stream 114 to determine if there is a match. In response to the comparison, authentication server 150 may provide an authentication decision 152, indicative of the results of the comparison, to authentication module 315. In another embodiment, authentication module 315 performs the authentication internally without utilizing any external authentication server. Authentication module 315 may receive reference stream 114 directly from content owner 110 compare the captured query audio 132 to the reference stream 114 to determine if there is a match. If the query audio 132 matches the reference stream 114 within some threshold or tolerance level, authentication module 315 may determine that the user is authenticated.

At block 620, method 600 requests authorization to stream the OTT content. In one embodiment, authorization module 325 provides an indication 148 of the authentication decision to authorization service 270. In response to the indication 148, authorization service 270 may issue an authorization token 272 back to second user device 140. At block 630, method 600 receives an authorization token 272 from authorization service 270. In one embodiment, the authorization token 272 indicates what OTT content the second user device 140 is authorized to receive. This may be based for example, on details of the user's subscription with MVPD 120.

At block 640, method 600 provides the authorization token 249 to OTT stream source 160. Upon receiving the token 272, authorization module 325 may pass the token 249 along with a request for OTT content to OTT stream source 160. OTT stream source 160 may receive the token 249 and pass the token 264 back to authorization service 270. If authorization service 270 verifies that the token 264 is valid (e.g., by comparing it to the token 272 issued to second user device 140), then authorization service 270 may determine that the user is authorized to receive the requested OTT content. Authorization service 270 may provide an affirmative authorization decision 274 to OTT stream source 160, which may in turn, provide the requested OTT content 162 to second user device 140. At block 650, method 600 receives the OTT content 162.

The ACR authentication techniques described herein may have applicability in a number of different uses cases. These use cases are intended to detail a set of test cases and expected outcomes for authentication. Although ACR authentication could be fooled in some situations, the risk of any one bad actor can be limited by the authorization service by considering the specific device history when issuing a token. Additionally, an incorrect authentication might only allow a user to view OTT streaming content for a set period of time. This OTT content may contain advertisements and other monetization elements that make this a low harm scenario for the content owners and MVPDs.

One use case occurs when a user is at their home. The user may press the identification button and tune their TV to a specified station. In this case, authentication is likely successful in less than 30 seconds.

Another use case occurs when a user is at public bar where a TV is playing. They press the identification button on their second device and the application instructs them to tune to a specific station. In one embodiment, the user is not permitted to change the TV channel, so the identification fails and authentication is denied. In another embodiment, the bar TV may already be tuned to the specified station, so the authorization is successful (although incorrect). In one embodiment, an authorization service may note that the GPS location of the device does not correlate to the GPS location of any residential MVPD subscriber account and deny authorization.

Another use case occurs when a user is at a friend's home. They press the authentication button and tune the TV to the specified channel. Authentication is successful, but incorrect. When the authorization expires, the user may authenticate at a different friend's home. Over time the authorization service could note that the device authorizes at several different GPS locations and deny access.

Another use case occurs when the user locates an unauthorized stream source on the Internet. They stream the audio and the authentication is successful (but incorrect). In this case the authentication may work because the stream is in fact a real time broadcast. If the stream is significantly delayed, the authentication may correctly fail. In one embodiment, ACR authentication could require the authentication to be completed quickly, i.e., within some set time period. Since the specific test channel may change each time, the bad actor may not have time to locate an internet stream of the specified test channel before the time period expires. If the authentication system has too many failures in a row it may decline to allow ACR authentication.

Another use case occurs when the user has a remote collaborator who is a subscriber to an MVPD. The user may be located anywhere and may press the authentication button and are instructed to tune to a specific channel. The user phones a collaborator who then tunes their own TV to the specific channel and puts their microphone up to the TV speaker. The user places their mobile device near their phone speaker. The authorization may be successful, but incorrect. This case requires a remote collaborator and that makes it more complex to accomplish. If tokens are good for a limited time, a remote collaborator may not want to keep doing this to help someone else. It is also possible for the user's device to communicate its GPS location to the authorization server. The authorization server may communicate to the MVPD subscriber database and determine that no known user subscribes to the MVPD at that geographic location. The authorization server could then deny authorization.

Another use case occurs when the user has a local collaborator. A user is anywhere with a friend who already has authorized their own mobile device. The user presses the authentication button and is instructed to tune to a specific channel. The local collaborator streams the specific channel OTT to their own device and the user's device hears the collaborator's device. In one embodiment, the OTT streams could be delayed by more than the allowed synchronization time limit, thereby preventing authentication.

Figure 7:
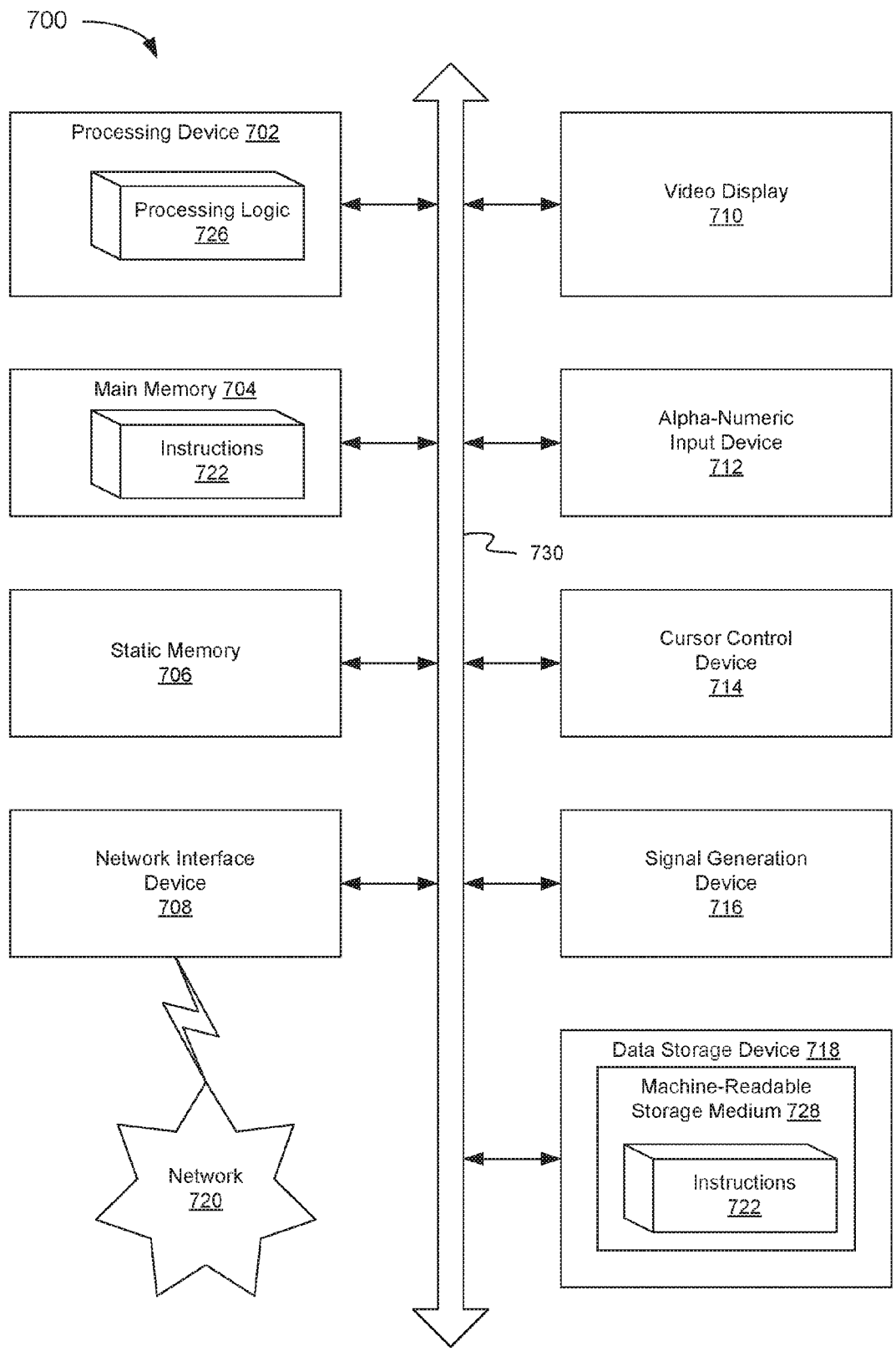
FIG. 7 is a block diagram illustrating an exemplary computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent second device 140, as shown in FIGS. 1a, 1b, 2 and 3.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the notification manager 210 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of media stream cue point creator 110 or 210) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   capturing a media sample played on a first user device, the media sample comprising at least one of an audio portion, a video portion or an image portion of a media stream received by the first user device from a remote media streaming source over a network, wherein the media sample is captured by a second user device located in proximity to the first user device;
   sending, by the second user device, at least a portion of the media sample to an authentication server, the authentication server to compare the at least the portion of the media sample to a reference media stream received from the remote media streaming source to determine that the second user device is authenticated for viewing the media stream responsive to the portion of the media sample matching the reference media stream; and
   receiving, by the second user device, an authentication decision from the authentication server, the authentication decision indicating whether the second user device is authenticated; and
   responsive to the second user device being authenticated, requesting the media stream from the remote media streaming source.

2. The method of claim 1, wherein to compare the at least the portion of the media sample to a reference media stream, the authentication server to:
   generate a fingerprint of the portion of the media sample;
   compare the fingerprint to a plurality of known segments in the reference media stream; and
   determine whether the fingerprint matches at least one of the plurality of known segments.

3. The method of claim 1, wherein the remote media streaming source comprises at least one of a content owner or a multichannel video program distributor (MVPD) associated with the media sample played on the first user device.

4. The method of claim 1, further comprising:
   responsive to the second user device not being authenticated, requesting additional authentication credentials from a user of the second user device.

5. The method of claim 1, further comprising:
   receiving an authorization token from the authorization service; and
   providing the authorization token to the remote media streaming source.

6. The method of claim 1, wherein a user of the first user device is a subscriber of a multichannel video program distributor (MVPD) that provides the media sample played on the first user device, and wherein the media stream from the remote media streaming source comprises an over the top (OTT) media stream.

7. A system comprising:
   a memory;
   a processing device operatively coupled to the memory, the processing device to:
     capture a media sample played on a first user device, the media sample comprising at least one of an audio portion, a video portion or an image portion of a media stream received by the first user device from a remote media streaming source over a network, wherein the media sample is captured by a second user device located in proximity to the first user device;
     send at least a portion of the media sample from the second user device to an authentication server, the authentication server to compare the at least the portion of the media sample to a reference media stream received from the remote media streaming source to determine that the second user device is authenticated for viewing the media stream responsive to the portion of the media sample matching the reference media stream; and
     receive an authentication decision from the authentication server at the second user device, the authentication decision indicating whether the second user device is authenticated; and
     request the media stream from the remote media streaming source responsive to the second user device being authenticated.

8. The system of claim 7, wherein to compare the portion of the media sample to the reference media stream, the authentication server to:
   generate a fingerprint of the portion of the media sample;
   compare the fingerprint to a plurality of known segments in the reference media stream; and
   determine whether the fingerprint matches at least one of the plurality of known segments.

9. The system of claim 7, wherein the remote media streaming source comprises at least one of a content owner or a multichannel video program distributor (MVPD) associated with the media sample played on the first user device.

10. The system of claim 7, wherein the processing device further to:
    responsive to the second user device not being authenticated, request additional authentication credentials from a user of the second user device.

11. The system of claim 7, wherein the processing device further to:
    receive an authorization token from the authorization service; and provide the authorization token to the remote media streaming source.

12. The system of claim 7, wherein a user of the first user device is a subscriber of a multichannel video program distributor (MVPD) that provides the media sample played on the first user device, and wherein the media stream from the remote media streaming source comprises an over the top (OTT) media stream.

13. A non-transitory computer-readable storage medium storing instructions which, when executed by a processing device, cause the processing device to:
   capture a media sample played on a first user device, the media sample comprising at least one of an audio portion, a video portion or an image portion of a media stream received by the first user device from a remote media streaming source over a network, wherein the media sample is captured by a second user device located in proximity to the first user device;
   send, by the second user device, at least a portion of the media sample to an authentication server, the authentication server to compare the at least the portion of the media sample to a reference media stream received from the remote media streaming source to determine that the second user device is authenticated for viewing the media stream responsive to the portion of the media sample matching the reference media stream; and
   receive, by the second user device, an authentication decision from the authentication server, the authentication decision indicating whether the second user device is authenticated; and
   responsive to the second user device being authenticated, request the media stream from the remote media streaming source.

14. The non-transitory computer-readable storage medium of claim 13, wherein to compare the portion of the media sample to the reference media stream, the authentication server to:
   generate a fingerprint of the portion of the media sample;
   compare the fingerprint to a plurality of known segments in the reference media stream; and
   determine whether the fingerprint matches at least one of the plurality of known segments.

15. The non-transitory computer-readable storage medium of claim 13, wherein the remote media streaming source comprises at least one of a content owner or a multichannel video program distributor (MVPD) associated with the media sample played on the first user device.

16. The non-transitory computer-readable storage medium of claim 13, wherein the instructions further cause the processing device to:
   responsive to the second user device not being authenticated, request additional authentication credentials from a user of the second user device.

17. The non-transitory computer-readable storage medium of claim 13, wherein the instructions further cause the processing device to:
   receive an authorization token from the authorization service; and
   provide the authorization token to the remote media streaming source.

\* \* \* \* \*